United States Patent
Morhard et al.

[11] Patent Number: 6,106,426
[45] Date of Patent: Aug. 22, 2000

[54] ARRANGEMENT FOR A DOUBLE SHAFT EXTRUDER

[75] Inventors: Hans Joachim Morhard; Alfons Böing, both of Bocholt, Germany

[73] Assignee: A. Frier, Flender AG, Bocholt, Germany

[21] Appl. No.: 09/325,520

[22] Filed: Jun. 3, 1999

[30] Foreign Application Priority Data

Jun. 4, 1998 [DE] Germany .................. 198 24 866

[51] Int. Cl.[7] ............................ F16H 37/06; F16H 3/72
[52] U.S. Cl. ........................ 475/6; 475/5; 366/83; 74/665 N
[58] Field of Search .................. 475/5, 6, 1, 2, 475/332; 74/665 N, 665 L; 366/83, 297; 425/204

[56] References Cited

U.S. PATENT DOCUMENTS

| | | | |
|---|---|---|---|
| 3,013,519 | 12/1961 | Wiggermann | 475/5 X |
| 3,824,875 | 7/1974 | Willert et al. | 74/665 N X |
| 3,947,000 | 3/1976 | De Putter | 366/83 |
| 4,136,580 | 1/1979 | Brand et al. | 74/665 N X |
| 4,514,164 | 4/1985 | Poulin | 366/83 X |
| 4,586,402 | 5/1986 | Schafer | 475/332 |
| 4,796,487 | 1/1989 | De Bernardi | 74/665 GA X |
| 4,899,620 | 2/1990 | Schiffer | 74/665 GA X |
| 5,092,189 | 3/1992 | Bonalumi | 74/665 N X |
| 5,213,010 | 5/1993 | Hayafusa et al. | 74/665 GA |
| 5,483,852 | 1/1996 | Stuemky | 74/665 GA |
| 5,511,874 | 4/1996 | Ikegami et al. | 74/665 GA X |

FOREIGN PATENT DOCUMENTS 2037395 7/1980 United Kingdom ........... 74/665 N

*Primary Examiner*—Charles A Marmor
*Assistant Examiner*—Ankur Parekh
*Attorney, Agent, or Firm*—Max Fogiel

[57] ABSTRACT

A transmission for a high-output two-shaft extruder, comprising a speed-reduction gear (1) and a distribution gear (2). The distribution gear has one take-off shaft (4) driven directly by the speed-reduction gear and another take-off shaft (5) driven by the first take-off shaft in conjunction with two distributor shafts (11 & 12), one on each side. The speed-reduction gear is a planetary gear, its sun wheel (21) driven by a main motor and its ring (27) by a superimposition motor, and its planetary bearing (25) coupled to the distribution gear's first take-off shaft. The main motor operates at a constant speed and is designed to handle most of the total power demand. The superimposition motor is regulable or discontinuously variable in speed and is designed to handle a fraction of the total power demand.

10 Claims, 4 Drawing Sheets

ARRANGEMENT FOR A DOUBLE SHAFT EXTRUDER

The present invention concerns a transmission for a two-shaft extruder.

BACKGROUND OF THE INVENTION

Such transmissions essentially comprise a speed-reduction gear and a distribution gear, which has a ratio of I=1.

The speed-reduction gear decreases the high speed of the motor to one that the extruder can use. The speed-reduction gear in one two-shaft extruder transmission, known from European Exposure 716 914, is a spur gear.

Known two-shaft extruder transmissions are powered by a three-phase motor with a fixed speed. A gearshift integrated into the speed-reduction gear makes it possible to establish two fixed take-off speeds at the distribution gear. The speed required by the extruder at any particular moment can accordingly be at least discontinuously established. The range of adjustment R=required for the extruder's screws is rather narrow, approximately 1.1 to 1.2. In spite of this narrow range, establishing the speed at extruder outputs as high as 10 000 kW is difficult. A mechanical gearshift for a two-shaft extruder transmission at this range of output is accordingly not without problems. One alternative, continuous speed adjustment by way of the motor (a direct-current motor) is complicated and expensive at that range and would require an auxiliary drive mechanism for the requisite creeping speed.

Both of the take-off shafts in the two-shaft extruder transmission are accommodated in the distribution gear, allowing the extruder shafts to be turned in the same or in opposite directions. One take-off shaft is coupled directly to the speed-reduction gear. The high stress on the parts dictates that the take-off shafts be very close together, and the output must accordingly be branched, with the power needed by the second take-off shaft divided by spur gears between two distribution-gear shafts and then recombined. Due to this bifurcation, the cogs on the spur gear will only need to handle one quarter of the total power. Furthermore, two axial bearings in the distribution gear accommodate the very powerful axial forces deriving from the extrusion process.

The distribution gears in the two-shaft extruder transmission known from European Exposure 716 914) are spur gears. The distribution gear in a two-shaft extruder transmission known from German OS 3 734 578 is a planetary gear with the speed-reduction gear transmission stages next to it. Spur gears are employed for the transmission stages.

Another distribution gear, a spur gear, is known from German Patent 3 418 543. Its power take-up shaft is freely adjustable axially and has two oppositely cogged pinions.

Also known are "superimposed gears", which operate with two motors to obtain continuous speed adjustment without mechanical gearshifts. Two speed factors can be added or subtracted within a single planetary gear in accordance with the gear's inner ratio $I_o$ and with the direction of the sun wheel and ring.

SUMMARY OF THE INVENTION

The object of the present invention is a transmission of the aforesaid genus that will allow the speed of the take-off shaft to be regulated at high powers, higher than 10 000 kW for example, at a justifiable expenditure.

The transmission in accordance with the present invention employs an in-itself known superimposed gear instead of a conventional spur gear as a speed-reduction gear. The superimposed gear has been adapted to the demands of a two-shaft extruder transmission in that one of its speed factors is constant and the other variable. These parameters can be selected to allow most of the extruder's power requirement to be derived from a main motor. The main motor can be a comparatively inexpensive three-phase motor. The superimposition motor and its controls can be responsible for only a fraction of the total power. This motor can accordingly be either a direct-current motor or a frequency-regulated three-phase motor with a continuously variable speed. A reversible multiple-pole three-phase motor can also be employed. If for example an adjustment range $R=n_{2max}/n_{2min}$ min of 1.1 is sufficient for the extruder shafts coupled to the take-off shafts and if the superimposition motor can be operated at a range $R_v=n_{Mmax}/n_{Mmin}$, the ratio will be $P_{tot}/P_v=$ approximately 10. For a total power demand of $P_{tot}=10\ 000$ kW, accordingly, the superimposition motor must be able to provide an output of $P_v=1000$ kW at a maximum motor speed and with $T_M$ constant. The narrower the prescribed adjustment range R at the take-off shafts and the wider the prescribed adjustment range $R_v$ of the superimposition motor, the greater the ratio $P_{tot}/P_v$ and hence the smaller the superimposition motor.

In addition to the overlapping of speeds, another essential advantage of planetary gears over the spur gears employed in conventional two-shaft extruder transmissions is the interior output branching. The incoming power can be distributed among three planet wheels for instance, and the individual cogs dimensioned for only one third of the total power (sectional rollover). In contrast to conventional spur gears, accordingly, the planetary gear in accordance with the present invention can be considerably more compact and lighter in weight with no sacrifice of reliability.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
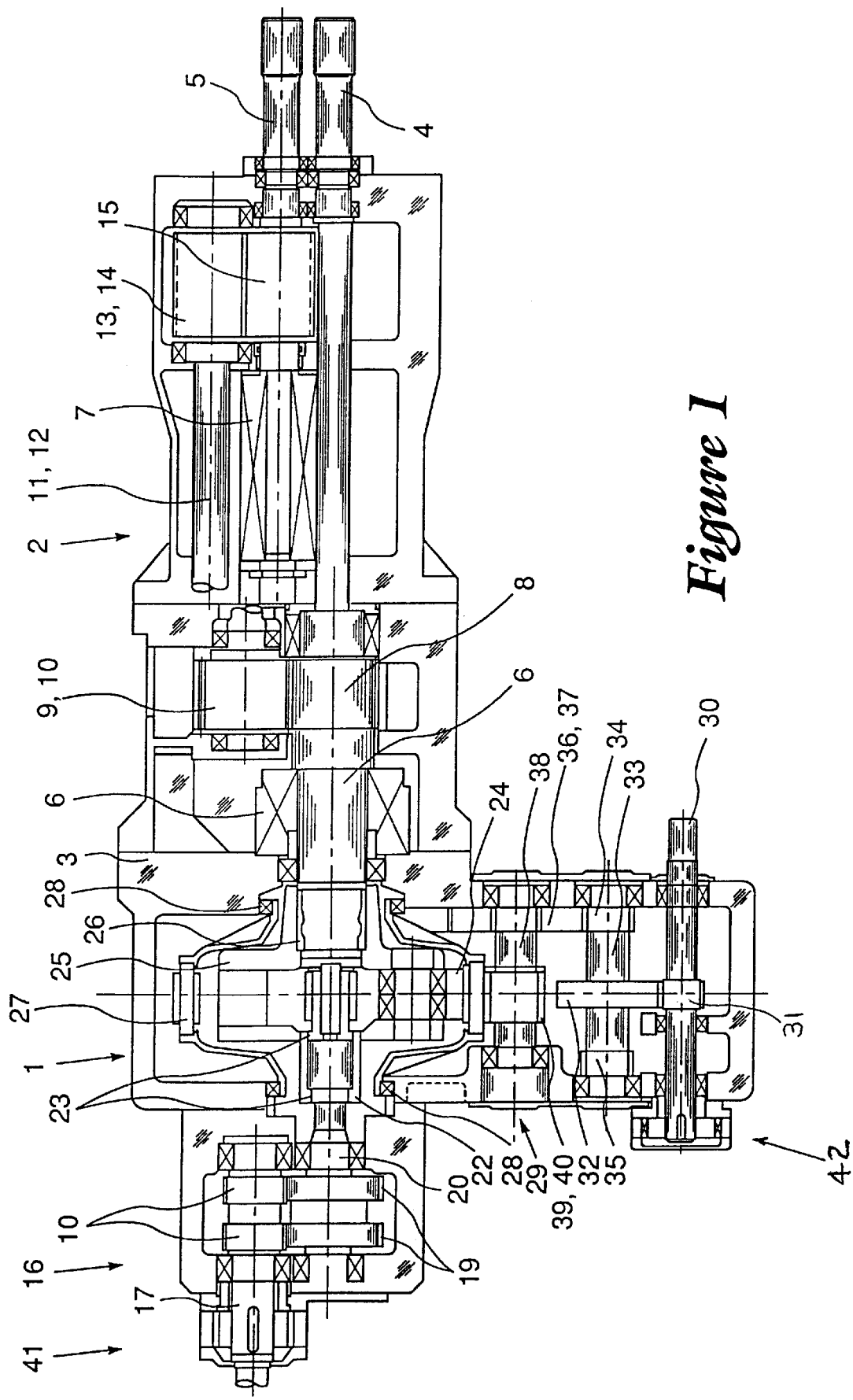
FIG. 1 is a longitudinal section through a transmission for a two-shaft extruder.

A transmission for an unillustrated two-shaft extruder comprises a speed-reduction gear 1 and a distribution gear 2 accommodated in a multiple-part housing 3. Distribution gear 2 is provided with two take-off shafts 4 and 5 coupled to the extruder's extrusion shaft. To accommodate the forces generated by the extrusion process, expressed as axial forces on the extrusion shafts and take-off shafts 4 and 5, the latter rest in axial bearings 6 and 7 in housing 3.

Figure 2:
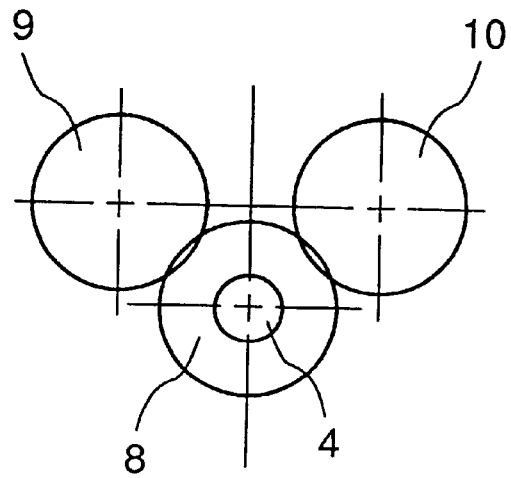
FIGS. 2 through 4 are face-on views of wheels.
Figure 3:
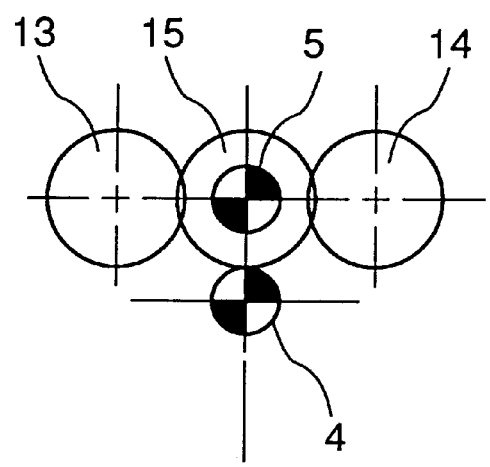

First take-off shaft 4 is directly coupled as will be specified hereinafter to speed-reduction gear 1. Mounted on this shaft is a cogwheel 8 that meshes as illustrated in FIG. 2 with two other cogwheels 9 and 10. Cogwheel 9 is mounted on a distribution-gear shaft 11 and cogwheel 10 on a parallel and adjacent distribution-gear shaft 12. A cogwheel 13 is mounted on the other end of distribution-gear shaft 11 and another cogwheel 14 on the other end of distribution-gear shaft 12. Cogwheels 13 and 14 mesh as illustrated in FIG. 3 with a cogwheel 15 mounted on second take-off shaft 5. Take-off shafts 4 and 5 will accordingly turn in the same direction. If an intermediate cogwheel is installed between cogwheel 8 and cogwheels 9 and 10, however, take-off shafts 4 and 5 will turn in opposite directions.

Speed-reduction gear 1 is a single-stage planetary gear. A spur gear 16 can be installed upstream of the planetary gear. Spur gear 16 includes a driveshaft 17 coupled to an unillustrated main motor in the form of a three-phase motor. Mounted on driveshaft 17 are two pinions 18 with opposing tapers. Each pinion 18 meshes with a cogwheel 19 mounted on an output shaft 20. Since the power introduced by way of driveshaft 17 is branched, the forces exerted by the cogs are halved. The load can be balanced by axially displacing output shaft 20 by means of cogwheels 19. This adjustment is automatic.

The single-stage planetary gear includes a sun wheel 21 that is coupled to driveshaft 17 either by way of the output shaft 20 of spur gear 16 if a spur gear is employed, or directly. Sun wheel 21 has no radial bearing and is coupled to driveshaft 17 or output shaft 20 by way of a two-way cogged coupling 23 integrated into the rotating components in the form of a cogged arc.

Sun wheel 21 has external cogs, and meshes with three planet wheels 24 uniformly distributed in a planetary bearing 25. Planetary bearing 25 is directly coupled to the first take-off shaft 4 of distribution gear 2 by way of cogs 26. Since sun wheel 21 has no bearing, it can center itself by axial displacement in the $\mu$m range from the theoretical center of the transmission with respect to the cogs of planet wheels 24 and accordingly ensure a uniform distribution of force among the three sets of cogs. This adjustment is automatic.

The planetary gear also includes a ring 27 with cogs on both its outer and its inner circumference that can rotate in bearings 28 in housing 3. Planet wheels 24 mesh with the ring's inner cogs.

Figure 4:
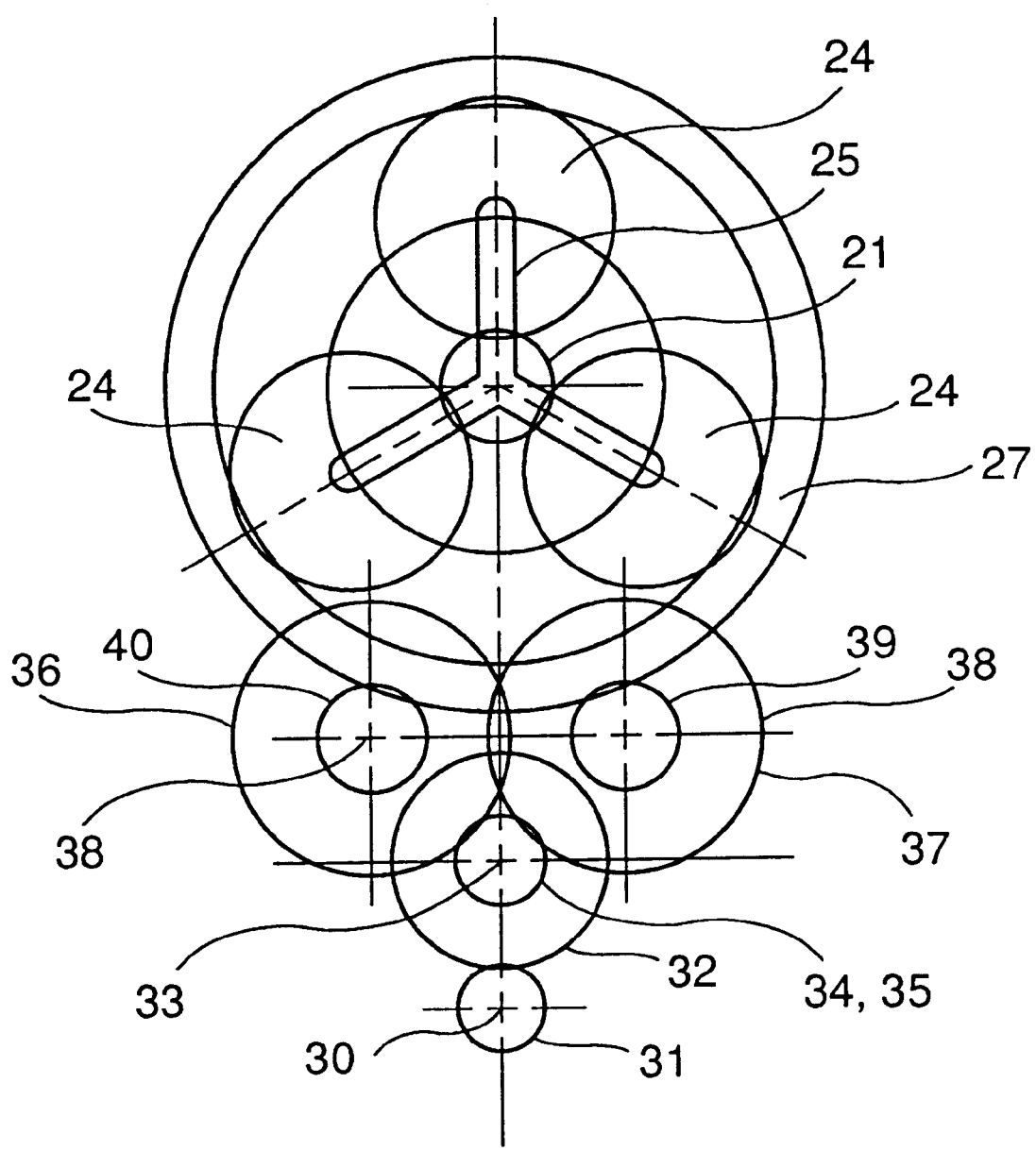

Ring 27 is preferably driven by an unillustrated superimposition motor by way of a power-branching gear 29. This motor is coupled to a driveshaft 30. Mounted on driveshaft 30 is a pinion 31 that meshes with a cogwheel 32 mounted on an intermediate shaft 33. Shaft 33 can be displaced axially in housing 3 and has two pinions 34 and 35 mounted on it. Pinion 34 meshes with a cogwheel 36, and pinion 35 with a cogwheel 37. Cogwheels 36 and 37 are mounted in pairs on two other intermediate shafts 38. Each intermediate shaft 38 has a pinion 39 or 40 mounted on it between cogwheels 36 and 37. Pinions 39 and 40 mesh with the outer cogs on ring 27. The resulting cogwheel system will be evident from FIG. 4. It is of advantage in this location because the torque on ring 27 almost equals that on planetary bearing 25 and is weaker only in relative to the ratio $i_o/(i_o+1)$. Here as well, the axial displacement of intermediate shaft 33 by pinions 34 and 35 ensures a balanced distribution of the load with the forces on the cogs halved. This procedure is automatic.

The single-stage planetary gear acts as a superimposed gear and simultaneously decreases the speed of take-off shafts 4 and 5. An extra reduction stage downstream of the planetary gear is unnecessary due to the direct coupling of planetary bearing 25 to first take-off shaft 4.

The planetary gear's transmission ratio $i_o$ is designed to accord with the speed of the main motor. Ring 27 remains unmodified. Another approach to adjusting the speed involves also positioning spur gear 16 between the main motor and sun wheel 21. In this event, the transmission ratio of spur gear 16 will accord with the speed of the main motor, and the transmission ratio $i_o$ of the planetary gear will be unaffected.

The main motor, a three-phase motor with a fixed speed, will cover most of the power demand. The superimposition motor, either a direct-current motor or a frequency-regulated three-phase motor with continuously variable speed regulation, is designed to handle a fraction of the demand. The result is continuously variable regulation of the output speed of take-off shafts 4 and 5 at the transmission's output over a range R=1.1 to 1.2. A superimposition motor with reversible poles can be employed instead of a continuously regulable superimposition motor. Quasi-continuous operation can be achieved over a narrow range R=1.1 and at a ratio of $P_{tot}/P_v$=approximately 24 with a reversible-pole three-phase motor at speeds $n_M$ of for example 500, 1000, or 1500 rpm from either the motor or a generator with a braked zero setting and with seven uniformly distributed take-off speeds. Operating the superimposition motor with a generator, however, is in many cases undesirable due to the loss of electricity to the public mains.

There is a reversing barrier 41 on driveshaft 17 and another reversing barrier 42 on driveshaft 30. Reversing barriers 41 and 42 allow operation with only one of the two motors. When only the main motor is on, take-off shafts 4 and 5 rotate at a constant speed dictated by the motor, by the transmission ratio of speed-reduction gear 1, and by that of spur gear 16 if one is present. The superimposed planetary gear accordingly acts as a planetary-state gear while the superimposed gear is stationary. When only the superimposition motor is on, the machinery can operate at the creep rate needed to set and establish the extruder's operation. In this event, the superimposition motor will replace the auxiliary drive mechanism present in conventional two-shaft extruder transmissions. With a reverse-operation preventer 41 on driveshaft 17, the superimposition motor can also be employed to start the transmission, the main motor being brought in once a certain speed has been attained. Reverse-operation preventers 41 and 42 allow operation only with the motor and not with a generator.

Figure 5:
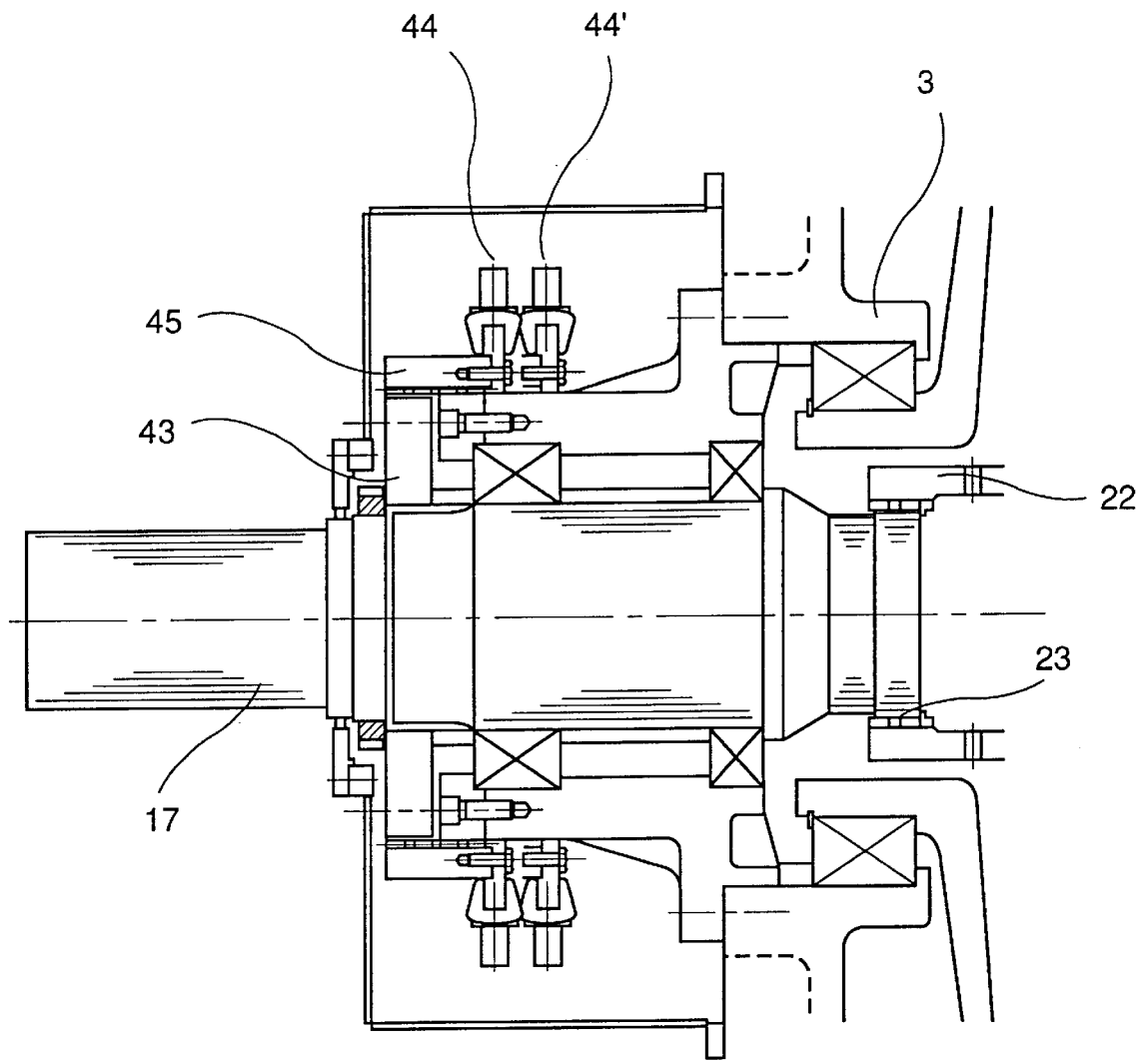
FIG. 5 illustrates one end of the driveshaft.

Instead of reverse-operation preventers 41 and 42, a gear-shifting coupling can be mounted on the driveshaft 17 coupled to the main motor. The driveshaft 30 coupled to the superimposition motor will in this event provided with a reverse-operation preventer 42 or brake. As will be evident from FIG. 5, the gear-shifting coupling consists of a disk 43 coupled non-rotating to driveshaft 17. The side of disk 43 facing away from driveshaft 17 is provided with cogs in alignment with similar cogs on an adjacent section of housing 3. A bushing 45 can be displaced between the two sets of cogs by a lever 44 such that it will span both disk 43 and the section of housing 3 at one limit of its travel. In this state, illustrated in FIG. 5, driveshaft 17 is locked to housing 3 by disk 43 and bushing 45. In the opposite position 44', take-bushing 45 has been retracted, releasing driveshaft 17. The gear-shift coupling can be shifted without load when the equipment is out of operation. While driveshaft 17 is locked to housing 3 by the gear-shifting coupling (with lever 44 in position 44'), enough force can be generated just by engaging the superimposition motor to eliminate the need for an auxiliary drive mechanism. When a gear-shifting coupling is employed, the superimposition motor cannot be used to start the transmission.

What is claimed is:

1. A transmission for a two-shaft extruder, comprising a speed-reduction gear and a distribution gear, said distribution gear having one take-off shaft driven directly by said speed-reduction gear and having another take-off shaft driven by said one take-off shaft; two distributor shafts on opposite circumferential sides of said another take-off shaft; said speed-reduction gear being a planetary gear having a sun wheel; a main motor for driving said sun wheel, said planetary gear having a ring; a superimposition motor for driving said ring; said planetary gear having a planetary bearing coupled to said one take-off shaft; said main motor operating at a constant speed and being designed to handle most of the total power demand; said superimposition motor being regulable or discontinuously variable in speed and being designed to handle a fraction of the total power demand.

2. A transmission as defined in claim 1, including a spur gear between said main motor and said sun wheel.

3. A transmission as defined in claim 2, wherein said spur gear has a power-branching function.

4. A transmission as defined in claim 1, including a superimposed gear with a power-branching function between said superimposition motor and said ring.

5. A tranmission as defined in claim 1, including a two-way cogged coupling, said sun wheel having no bearing and being coupled to a driveshaft coupled to said main motor by way of said two-way cogged coupling.

6. A transmission as defined in claim 1, including a driveshaft coupled to said main motor and having a first reverse-operation preventer; and a driveshaft coupled to said superimposition motor with a second reverse-operation preventer.

7. A transimission as defined in claim 1, including a drive shaft coupled to said main motor and having an end; a gear-shifting coupling on said end; a housing accommodating said transmission, said gear-shifting coupling coupling said drive shaft to said housing at one limiting position and releasing said drive shaft at another limiting position.

8. A transmission as defined in claim 7, including a driveshaft coupled to said superimposition motor and having a brake or reverse-operation preventer.

9. A transmission as defined in claim 1, wherein said planetary gear is single-stage and said planetary bearing is directly coupled to said one take-off shaft.

10. A transmission as defined in claim 1, wherein said sun wheel has no bearing and is coupled to an output shaft from said spur gear by way of a two-way cogged coupling.

* * * * *